(12) United States Patent
Kawai

(10) Patent No.: US 11,322,828 B2
(45) Date of Patent: May 3, 2022

(54) METHOD OF MANUFACTURING PRODUCT, EXTERIOR JACKET COMPONENT AND ANTENNA PATTERN SELECTION DEVICE

(71) Applicant: OMRON Corporation, Kyoto (JP)

(72) Inventor: Wakahiro Kawai, Konan (JP)

(73) Assignee: OMRON CORPORATION, Kyoto (JP)

( * ) Notice: Subject to any disclaimer, the term of this patent is extended or adjusted under 35 U.S.C. 154(b) by 124 days.

(21) Appl. No.: 16/462,277

(22) PCT Filed: Nov. 16, 2017

(86) PCT No.: PCT/JP2017/041271
§ 371 (c)(1),
(2) Date: May 20, 2019

(87) PCT Pub. No.: WO2018/154880
PCT Pub. Date: Aug. 30, 2018

(65) Prior Publication Data
US 2019/0386390 A1 Dec. 19, 2019

(30) Foreign Application Priority Data
Feb. 22, 2017 (JP) .............................. JP2017-030838

(51) Int. Cl.
*H01Q 1/38* (2006.01)
*G06K 19/077* (2006.01)

(52) U.S. Cl.
CPC ......... *H01Q 1/38* (2013.01); *G06K 19/07724* (2013.01)

(58) Field of Classification Search
CPC ....................................................... H01Q 1/38
(Continued)

(56) References Cited

U.S. PATENT DOCUMENTS

2006/0043199 A1* 3/2006 Baba ................ G06K 19/07758
235/492
2007/0069037 A1 3/2007 Kawai
(Continued)

FOREIGN PATENT DOCUMENTS

CN 101460962 A 6/2009
CN 101587845 A 11/2009
(Continued)

OTHER PUBLICATIONS

English translation of the International Search Report("ISR") of PCT/JP2017/041271 dated Jan. 30, 2018.
(Continued)

*Primary Examiner* — Allyson N Trail
(74) *Attorney, Agent, or Firm* — Metrolex IP Law Group, PLLC

(57) ABSTRACT

A method of manufacturing a relay includes a molded resin element step configured to produce a molded resin element with an IC chip is embedded therein by injecting a resin around the IC chip; an assembly step configured to apply the molded resin element to a base material as an exterior jacket component of the relay, the base material serving as the main body of the relay; and an antenna wiring forming step configured to print an antenna wiring on a surface of the molded resin element, the antenna wiring configured to allow the IC chip to perform wireless communication.

1 Claim, 15 Drawing Sheets

(58) Field of Classification Search
USPC .......................................................... 29/600
See application file for complete search history.

(56) References Cited

U.S. PATENT DOCUMENTS

| | | | |
|---|---|---|---|
| 2009/0191668 A1 | 7/2009 | Usami | |
| 2009/0217515 A1* | 9/2009 | Aoyama | G06K 19/07749 29/832 |
| 2014/0138446 A1* | 5/2014 | Wu | G06K 19/0775 235/492 |
| 2016/0189024 A1 | 6/2016 | Rampetzreiter et al. | |
| 2020/0343196 A1* | 10/2020 | Tsai | H01L 24/48 |

FOREIGN PATENT DOCUMENTS

| | | |
|---|---|---|
| EP | 1369816 A1 | 12/2003 |
| JP | 2000-294577 A | 10/2000 |
| JP | 2002-261421 A | 9/2002 |
| JP | 2002-298116 A | 10/2002 |
| JP | 2005-301443 A | 10/2005 |
| JP | 2006-039902 A | 2/2006 |
| JP | 2006-74266 A | 3/2006 |
| JP | 2007-096768 A | 4/2007 |
| JP | 2008-210344 A | 9/2008 |
| WO | 2013070747 A1 | 5/2013 |

OTHER PUBLICATIONS

Written Opinion("WO") of PCT/JP2017/041271 dated Jan. 30, 2018.
Partial supplementary European search report (R. 164 EPC) dated Mar. 27, 2020 in a counterpart European patent application.
Extended European search report (EESR) dated Jul. 9, 2020 in a counterpart European patent application.
Chinese Office Action dated Nov. 24, 2021 for the counterpart Chinese patent application.

* cited by examiner

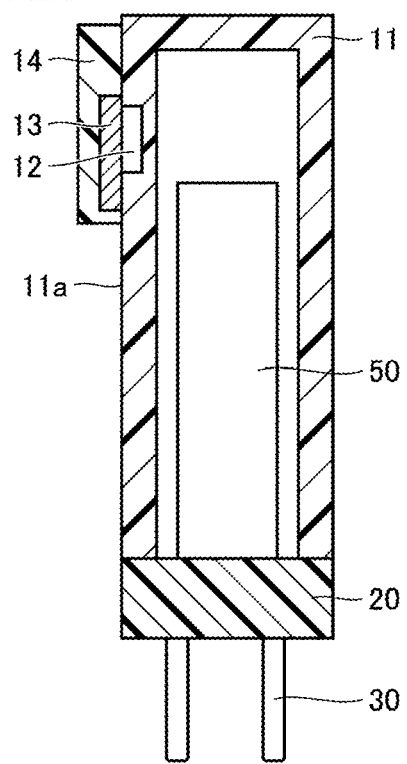

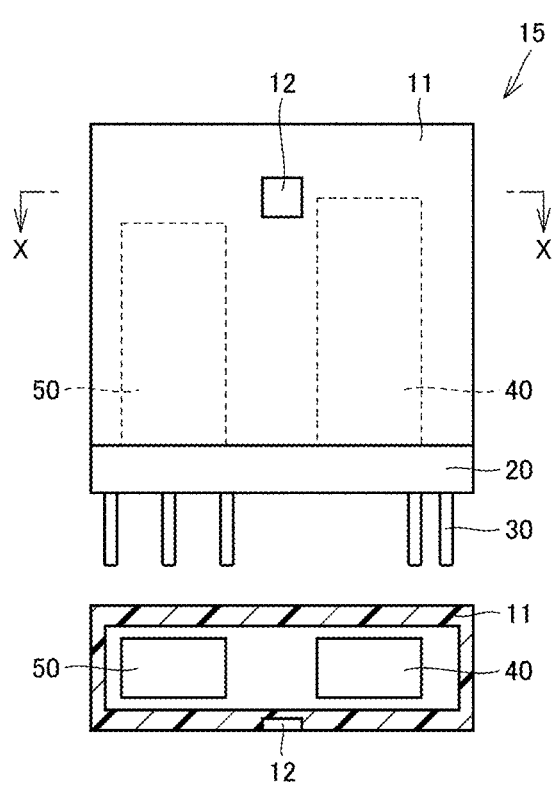

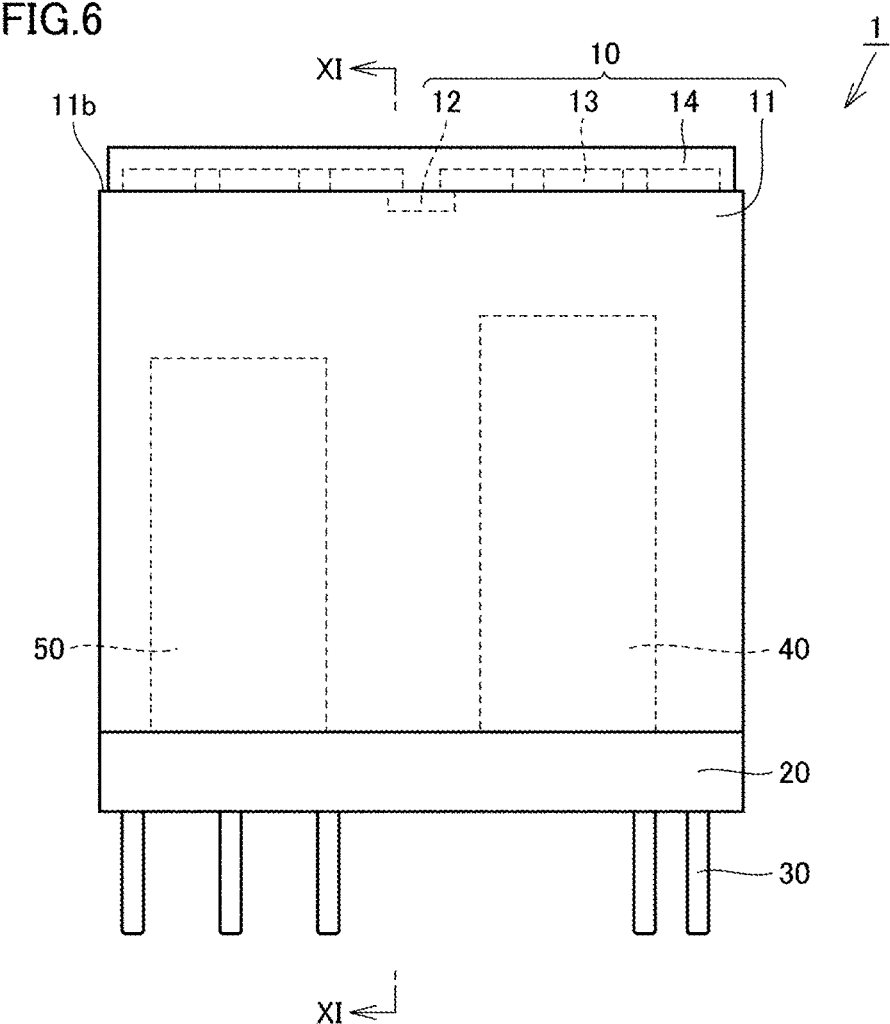

METHOD OF MANUFACTURING PRODUCT, EXTERIOR JACKET COMPONENT AND ANTENNA PATTERN SELECTION DEVICE

FIELD

The present technology relates to a method of manufacturing a product provided with an IC chip capable of wireless communication, an exterior jacket component therefor and an antenna pattern selection device.

BACKGROUND

Recently there has been increasing demand for the ability to understand identification information for each manufactured product, the goal being to manage lifetime or repair histories for various products, or to monitor of the environment, or the like in which the product is installed. For instance, the demand may be to understand the identification information for parts built into devices used in a factory.

Existing technologies attempt to answer these demands by placing bar code or two-dimensional code labels on the product. However, a reader must be brought facing the label to read the code on the label. Therefore, produces (or parts) mounted inside a device, or products (or parts) that are densely mounted tend to be difficult to access.

Using an integrated circuit tag (IC tag), which is capable of non-contact communication such as through the UHF electromagnetic band, is one known method of resolving this problem. An IC tag and reader are capable of communicating data via electromagnetic waves. Therefore, even if the reader is not facing the IC tag, the reader is capable of acquiring identification information from the IC tag.

A typical IC tag may be made from an antenna that is etched with copper foil or screen printed using a conductive paste, e.g., silver onto a polyethylene terephthalate (PET) or polyamide film, and an IC chip. The IC tag is then pasted onto the product using an adhesive agent, or the like.

Incidentally, the frequency that an IC tag may use differs based on the country. Therefore, the resonant frequency of the antenna must be modified to match the country to which the product will be shipped. Japanese Patent Publication No. 2007-96768 (Patent Document 1) discloses a technique of changing the where the IC chip is connected to the antenna to produce an IC tag with different frequency bands. Japanese Patent Publication No. 2005-301443 (Patent Document 2) discloses a technique of preparing a plurality of circuit elements in advance, and burning the circuit elements that are not needed to match the required frequency.

The IC chip making up the IC tag is extremely susceptible to mechanical stress, and breaks easily. Thus, Japanese Patent Publication No. 2008-210344 (Patent Document 3) discloses technology for embedding the entire IC tag in a resin or rubber material to protect the IC chip. Japanese Patent Publication Nos. 2000-294577 (Patent Document 4) and 2002-261421 (Patent Document 5) discloses technology for creating an IC tag by embedding the IC chip in a flat substrate and forming an antenna for connection to a terminal of the IC chip that is exposed.

RELATED ART DOCUMENTS

Patent Documents

[Patent Document 1] Japanese Patent Publication No. 2007-96768
[Patent Document 2] Japanese Patent Publication No. 2005-301443
[Patent Document 3] Japanese Patent Publication No. 2008-210344
[Patent Document 4] Japanese Patent Publication No. 2000-294577
[Patent Document 5] Japanese Patent Publication No. 2002-261421

SUMMARY

Technical Problem

However, the technology described in JP 2007-96768 A is limited in the range of modification that can be made since the connection location of the antenna and the IC chip determines the frequency band. Additionally, it may not be possible to change the shape of the antenna (e.g., patch antenna or loop antenna) depending on the communication range needed. Therefore, this requires preparing and storing a plurality of individual IC tags that have an antenna that matches the frequency rules for the country to which the product will be shipped or the required communication range. This increases the manufacturing cost. The technology described in JP 2005-301443 A suffers the same deficiency.

The IC tags produced using the techniques described in JP 2008-210344 A, JP 2000-294577 A, and JP 2002-261421 A, are typically mounted inside the product. Therefore, these techniques require that the product using an IC tag is assembled after the shipping destination of the product is determined, and said IC tag is prepared with an antenna that has the resonant frequency matching said destination. Accordingly, from ordering to the completion of the product takes time.

With a view to address the forgoing problems, the present invention provides a method of manufacturing a product, and an exterior jacket component and antenna pattern selection device therefor which are capable of easily manufacturing a product within a short period from an order where the product is provided with an IC tag having an antenna pattern that can be selected from various types of antenna patterns.

Solution to Problem

According to one aspect, a manufacturing method for a product includes: a first step of injecting resin to surround an IC chip storing identification data that identifies said product to thereby create a molded resin element with the IC chip embedded therein; a second step of applying the molded resin element to a product unit as an exterior jacket component for the product; and a third step of printing antenna wiring onto the outer surface of the molded resin element applied to the product unit, the antenna wiring configured for the IC chip to perform wireless communication.

The manufacturing method may also include: a fourth step of determining a pattern for the antenna wiring on the basis of at least one of the frequency rule of the shipping destination for the product; and the usage environment for the product. The pattern determined in the fourth step may be printed in the third step as the pattern for the antenna wiring.

In another aspect, an exterior jacket component for a product is provided with a molded resin element. The surface of the molded resin element includes a first surface that is the outer surface of the exterior jacket component.

The exterior jacket component may also be provided with an IC chip embedded in the molded resin element and configured to store identification data that identifies the product, and an antenna wiring formed on the first surface and configured to allow the IC chip to perform wireless communication.

The exterior jacket component may further include an insulating film formed on the antenna wiring. The IC chip may be exposed from the first surface; and the antenna wiring 13 may be electrically connected to the IC chip.

The exterior jacket component may further include an IC-side antenna connected to the IC chip; and the IC chip and IC-side antenna may be integrally configured into an IC module; and the IC module may be embedded in the molded resin element. The antenna wiring is configured as a booster antenna for electromagnetic coupling with the IC-side antenna.

The surface of the molded resin element includes a second surface that is an inner surface of the exterior jacket component; the second surface is the reverse side of the first surface; and the IC module is embedded in the molded resin element so that the IC module is exposed from the second surface; and the antenna wiring is formed on the first surface to face the IC module.

Alternatively, the molded resin element may contain a first molded resin component and a second molded resin component; the first surface is a portion of the outer surface of the first molded resin component; the outer surface of the second molded resin component contains a second surface in the same plane as the first surface; and the IC module is embedded in the second molded resin component and exposed from the second surface.

In another aspect, an antenna pattern selection device configured for selecting a pattern for an antenna wiring on the above exterior jacket component includes: a first input unit configured to accept input of shipping information indicating a shipping destination for a product; a second input unit configured to accept input of environmental information indicating a usage environment for the product; a communication parameter-setting unit configured to establish a communication parameter for the antenna wiring on the basis of the usage environment indicated by the environmental information; and an antenna pattern selection unit configured to select a pattern for the antenna wiring corresponding to a shipping destination indicated by shipping information and a communication parameter selected by the communication parameter setting unit on the basis of information mapping a shipping destination and a communication parameter to a pattern for the antenna wiring.

Effects

As described herein, a product can be easily manufactured within a short period after an order, where the product includes an IC tag with an antenna pattern that can be selected from various types of antenna patterns.

BRIEF DESCRIPTION OF THE DRAWINGS

FIG. 3 is a cross-sectional view along the line XI-XI in FIG. 1;

FIG. 4A, FIG. 4B, and FIG. 4C are for describing the manufacturing steps up to the half-finished product with antenna wiring is that is incomplete;

FIG. 6 is a front view illustrating an example of modifying the relay;

DETAILED DESCRIPTION

Figure 1:
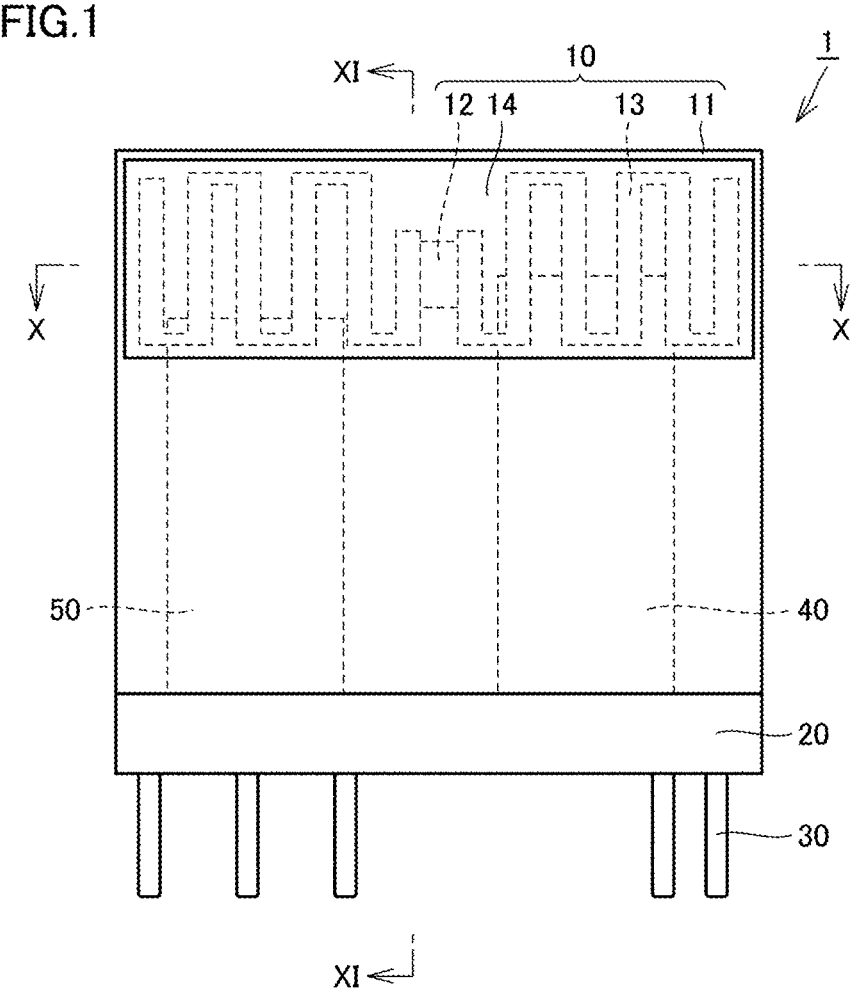
FIG. 1 is a front view illustrating a relay according to a first embodiment.

Embodiments of the present invention are described in detail with reference to the drawings. The same or corresponding elements within the drawings are given the same reference numerals and the explanations therefor will not be repeated. Further, the embodiments and modifications described below may be selectively combined as appropriate.

Below an exterior jacket component for a relay is described as an example of an exterior jacket component. However, the exterior jacket component is not limited to the exterior jacket component of a relay; the exterior jacket component may be for other manufactured products (such as an ink cartridge or the like).

First Embodiment

Structure of a Relay

Figure 2:
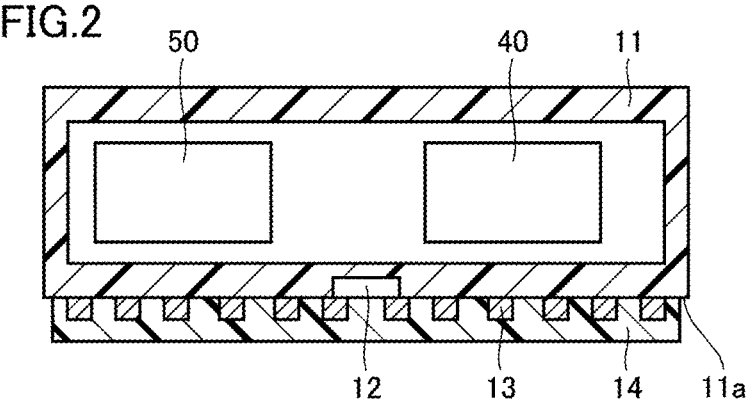
FIG. 2 is a cross-sectional view along the line X-X in FIG. 1.

An overview of the configuration of a relay 1 (a product) is described with reference to FIG. 1 through FIG. 3; the relay 1 is provided with an exterior jacket component 10 according to a first embodiment. FIG. 1 is a front view illustrating the relay 1 according to the first embodiment; FIG. 2 is a cross-sectional view along the line X-X in FIG. 1; and FIG. 3 is a cross-sectional view along the line XI-XI in FIG. 1.

As illustrated in FIG. 1 through FIG. 3, the relay 1 is provided with an exterior jacket component 10, a base material 20, a plurality of terminals 30, an electromagnet 40, and a contact part 50. The base material 20, the plurality of terminals 30, the electromagnet 40, and the contact part 50 constitute the relay body of the relay 1 (product body).

The electromagnet 40 and the contact part 50 are mounted on one surface on the flat base material 20. Each terminal of the plurality of terminals 30 are connected to the electromagnets 40 or the contact part 50 and pass through the base material 20 to protrude from the other side of the base material 20.

The contact part 50 is configured from a fixed contact and a movable contact. When a terminal 13 connected to the coil of the electromagnet 40 is energized, an iron core (not shown) moves under the magnetic force of the electromagnet 40. The movable contact moves towards the fixed contact in accordance with the movement of said iron core, and electrically connects to the fixed contact. The movable contact moves away from the fixed contacts due to an elastic force when the coil of the electromagnet 40 is no longer energized. Thus, the movable contact is no longer electrically connected to the fixed contact.

The exterior jacket component 10 is a box-shaped cover that covers the electromagnet 40 and the contact part 50. The open end of the exterior jacket component 10 is bonded to the surface of the base material 20 which the electromagnet 40 and the contact part 50 are mounted. The electromagnet 40 and the contact part 50 are thus housed within the internal space of the exterior jacket component 10. Note that the shape of the exterior jacket component 10 is not particularly limited.

Structure of the Exterior Jacket Component

As illustrated in FIG. 1 through FIG. 3, the exterior jacket component 10 is provided with a molded resin element 11, and IC chip 12, antenna wiring 13, and an insulating film 14.

The IC chip 12 stores identification data that identifies the relay 1; the IC chip 12 output said identification data in accordance with an external request. The identification data may be used for authentication between the IC chip 12 and an external reader. Besides an individual number for the relay 1, the identification data may also contain the various information for the relay 1 such as the specification, the characteristics, and the manufacturing date.

The molded resin element 11 is a box shaped and serves as the main body of the exterior jacket component 10. Their molded resin elements 11 may be a resin composed from poly carbonate (PC), acrylonitrile-butadiene-styrene (ABS), or polypropylene (PP). The shape of the molded resin element 11 is not particularly limited; the shape of the molded resin element may be designed to match the relay 1 as appropriate. The materials used for the molded resin element 11 is also not particularly limited.

The surface of the molded resin element 11 contains a surface 11a that is the outer surface of the exterior jacket component 10. The surface 11a may have the largest area of the four side surfaces making up the box shape molded resin element 11.

The molded resin element 11 surrounds the IC chip 12 so that the IC chip 12 is exposed from the surface 11a. The surface of the IC chip 12 that is exposed from the molded resin element 11 includes a terminal for connecting to the antenna wiring 13.

The antenna wiring 13 is formed on the surface 11a of the molded resin element 11 and is a conductive circuit that can be electrically connected to the terminal of the IC chip 12. The antenna wiring 13 may be easily produced by, for instance, using an inkjet printer to print silver ink (Ag). Inkjet printing refers to ejecting ink from a nozzle to build up ink on a surface for printing. The antenna wiring 13 may be composed of material other than silver (Ag).

The antenna wiring 13 is formed on the surface 11a at a location furthest from the electromagnet 40 to prevent the antenna 13 from being affected by the electrical scratch that by the magnetic field produced by electromagnetic 40.

The insulating film 14 is formed on the surface 11a of the molded resin element 11 to cover the antenna wiring 13. The antenna wiring 13 is thus shielded from external air. The insulating film 14 may be produced from a resist ink that is ultraviolet curable.

Method for Manufacturing the Relay

Figure 5A:
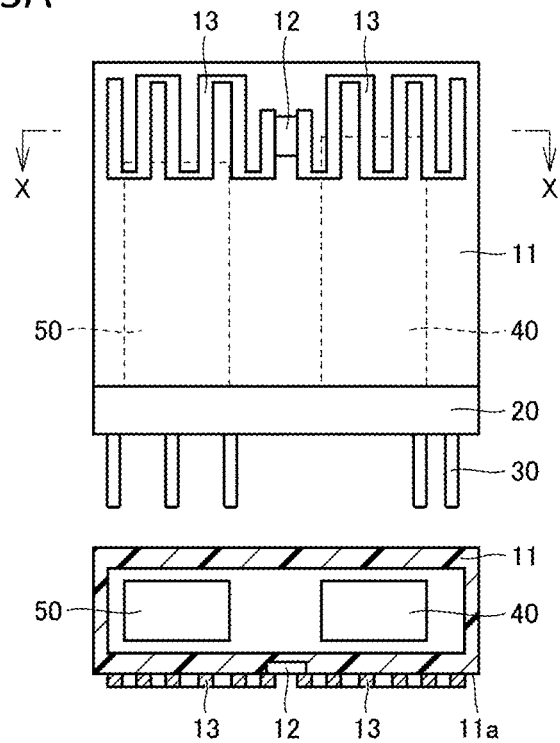
FIG. 5A and FIG. 5B are for describing the manufacturing steps from the half finished products to the completed relay.
Figure 5B:
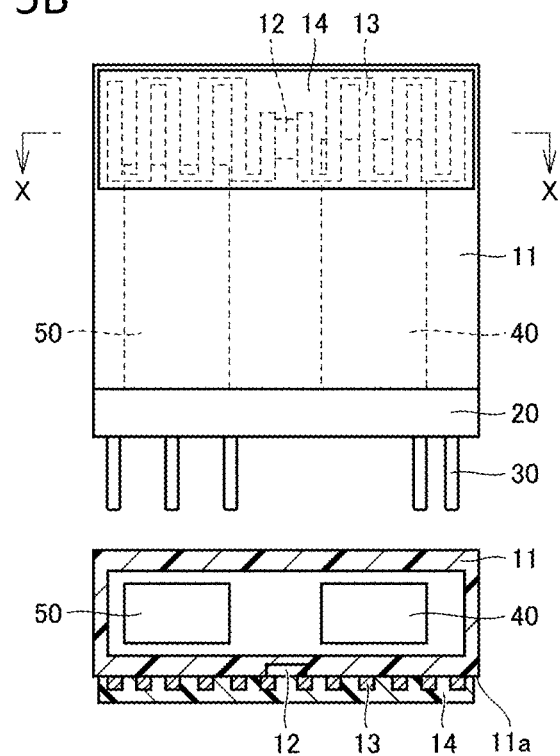

A method for manufacturing the relay 1 is described next with reference to FIG. 4 and FIG. 5. FIG. 4 is for describing the manufacturing steps up to the half-finished product with antenna wiring is that is incomplete; and FIG. 5 is for describing the manufacturing steps from the half finished products to the completed relay 1. The upper part is a front view and the lower part is a cross-sectional view along the line X-X of the front view in FIG. 4B, FIG. 4C and FIG. 5A, FIG. 5B.

Temporary Fixing Step

As illustrated in FIG. 4A, the IC chip 12 is pasted to a temporary fixing sheet 100 using an adhesive agent to thereby temporarily secure the IC chip 12. At this point, the IC chip 12 is pasted so that the terminal for connection to the antenna wiring 13 is in contact with the temporary fixing sheet 100.

Materials such as polyethylene terephthalate (PET), polyethylene naphthalate (PEN), polyphenylene sulfide (PPS), or the like may be used for the temporary fixing sheet 100. The temporary fixing sheet 100 is preferably made from a material that is flexible and transmits ultraviolet light.

Temporary fixing involves coating one surface of the temporary fixing sheet 200 with, for instance, an ultraviolet curable adhesive (not shown) In using the temporary fixing sheet 100. For example, a temporary fixing sheet 100 made of PET with a thickness of 50 μm may be coated with an ultraviolet curable adhesive of 2 to 3 μm thickness. This coating may be performed using a method such as ink jet printing or the like. Subsequently, the IC chip 12 is placed at a predetermined location. The temporary fixing sheet 200 is then irradiated with an ultraviolet light at, e.g., 3000 mJ/cm$^2$ from the surface not carrying the IC chip 12; thus, the adhesive is cured and the IC chip 12 is temporarily secured to the temporary fixing sheet 100.

Resin Molding Step

The temporary fixing sheet 100 with the IC chip 12 temporarily secured thereto is placed in a mold. At this point, the temporary fixing sheet 100 is arranged in the mold so that there is a space between the inner surface of the mold and the surface of the temporary fixing sheet 100 whereon IC chip 12 is adhered.

The internal space of the mold is shaped substantially the same as the shape of the molded resin element 11 illustrated in FIG. 1 through FIG. 3. The temporary fixing sheet 100 is placed on the inner surface of the mold to correspond to the surface 11a of the molded resin element 11. A resin is then injected into the internal space of the mold to produce the molded resin element 11 illustrated in FIG. 4B. The resin is injected inside the space in the mold to fill the space and surrounds the IC chip 12. The IC chip 12 is therefore embedded in the molded resin element 11.

The conditions for injection molding may be selected as appropriate for the resin used; for example, when using polycarbonate (PC), the PC may be injection molded at an injection temperature of 270° C. and an injection pressure of 1000 MPa. Additionally, when using acrylonitrile-butadiene-styrene (ABS), the ABS may be injection molded at an injection temperature of 180° C. and an injection pressure of 20 kgf/cm$^2$. Various types of resin materials may be adopted for injection molding.

The temporary fixing sheet 100 is peeled from the molded resin element 11 once the molded resin element is extracted from the mold. The surface 11a of the molded resin element 11 that was in contact with the temporary fixing sheet 100 is thus exposed; and the portion of the IC chip 12 in contact with the temporary fixing sheet 100 (including the terminal) is also exposed from the surface 11a.

If the temporary fixing sheet 100 is a PET film, the temporary fixing sheet 100 deforms to a large extent in accordance with the heat when the resin material is being injected. Thus, this facilitate separating the temporary fixing sheet 100 from the molded resin element 11.

Assembly Step

The electromagnet 40 and the contact part 50 are then mounted on one surface of the base material 20. The base material 20 is then perforated from the other surface with the plurality of terminals 30. The terminals are connected to the electromagnet 40 or the contact part 50 via soldering whereby the body of the relay 1 (product body) is produced. The molded resin element 11 obtained during the resin molding step is installed on the base material 20 to that the molded resin element 11 covers the electromagnet 40 and the contact part 50. A half-finished product 15 for the relay 1 is thus created as illustrated in FIG. 4C.

The half-finished product 15 has a common configuration regardless of the shipping country, or the like, of the relay 1. Therefore, the half-finished product 15 may be maintained as inventory and the relay 1 produced as a complete product depending on the shipping destination or the like by executing the following manufacturing steps after receiving an order.

Antenna Pattern Determination Step

The shape of the antenna wiring 13 (the antenna pattern) is determined accounting for the frequency rules of the shipping destination and the communication range required in the usage environment of the relay 1. The aforementioned determination is conducted by an antenna pattern selection device (later described). The shape of the antenna wiring 13 (the antenna pattern) may be determined in accordance with only the frequency rules of the shipping destination for the relay 1 if the usage environment for the relay 1 is already specified. Alternatively, the shape of the antenna wiring 13 (the antenna pattern) may be determined in accordance with only the usage environment of the relay 1 if the shipping destination for the relay 1 is already specified.

Antenna Wiring Formation Step

As illustrated in FIG. 5A, the antenna wiring 13 is formed on the surface 11a of the molded resin element 11 (i.e., the surface of the IC chip 12 that is exposed) for connection to the terminal of the IC chip 12. An IC tag made up of the IC chip 12 and the antenna wiring 13 is thus complete.

The antenna wiring 13 may be produce through ink jet printing, with a printer ejecting conductive material (e.g., silver nano ink or the like). the printer may print the antenna wiring 13 in accordance with a printing program that specifies the shape of the antenna wiring 13.

The antenna wiring 13 may be shaped as appropriate in accordance with the shipping destination for the relay 1 or the usage environment as above described. If the antenna wiring 13 is produced via etching using a photomask, photo masks must be prepared in advance for the various shapes of the antenna wiring 13. Similarly, screens must be prepared in advance for the various shapes of the antenna wiring 13, if the antenna wiring 13 is produced via screen printing. Therefore, work steps become more complicated when etching or screen printing is used to create the antenna wiring 13 and preparing a variety of photo masks or screens in advance also incurs costs. In contrast, if the antenna wiring 13 is created using ink jet printing, the shape for the antenna wiring 13 can be easily modified by modifying the printing program used by the printer. Thus, producing the antenna wiring 13 using an inkjet printing is suited for manufacturing the relay 1 of various types/various types of the relay 1.

Insulation Film Forming Step

Finally, as illustrated in FIG. 5B, and insulating film 14 (resist) is formed on the surface 11a of the molded resin element 11 to cover the antenna wiring 13. Thus, this presents prevents sulphuration or oxidation of the antenna wiring 13, and prevents wear of the antenna wiring 13 from mechanical loads. The insulating film 14 is formed by selectively jetting a known ultraviolet curable resin material over the antenna wiring 13 and curing the material.

Example of Modifying the Relay Configuration

Figure 7:
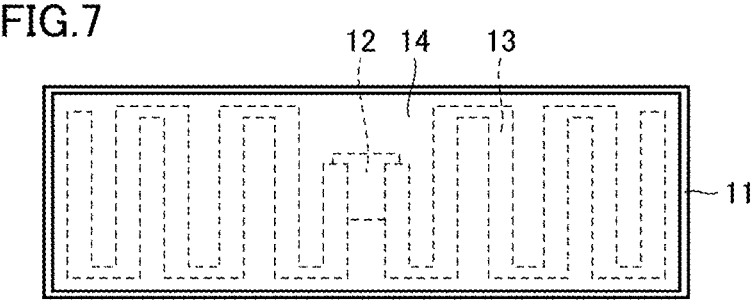
FIG. 7 is a plan view illustrating an example of modifying the relay.

The antenna wiring 13 may be created forms on a surface that is different from the surface 11a of the molded resin element 11. A relay 1 with the antenna wiring 13 formed on the upper surface 11b of the molded resin element 11 is described with reference to FIG. 6 through FIG. 8. FIG. 6 is a front view illustrating an example of modifying the relay 1; FIG. 7 is a plan view illustrating an example of modifying the relay 1; and FIG. 8 is a cross-sectional view along the line XI-XI in FIG. 6.

Figure 8:
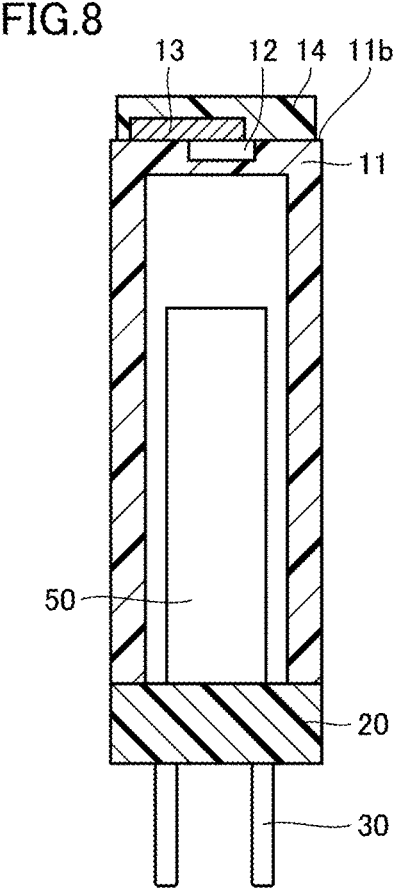
FIG. 8 is a cross-sectional view along the line XI-XI in FIG. 6.

As illustrated in FIG. 6 through FIG. 8, the IC chip 12 is embedded in the molded resin element 11 so that the IC chip 12 is exposed from the upper surface 11b of the molded resin element 11. The antenna wiring 13 is formed on the upper surface 11b of the molded resin element 11 and connected to the IC chip 12. The insulating film 14 is formed on the upper surface 11b of the molded resin element 11 to cover the antenna wiring 13.

In this example of modifying the relay 1, the antenna wiring 13 is formed at a location furthest from the electromagnet 40. Therefore, this reduces the effects of the magnetic field generated by the electromagnet 40 on the electromagnetic waves sent and received by the antenna wiring 13.

Antenna Pattern Selection Device

Figure 9:
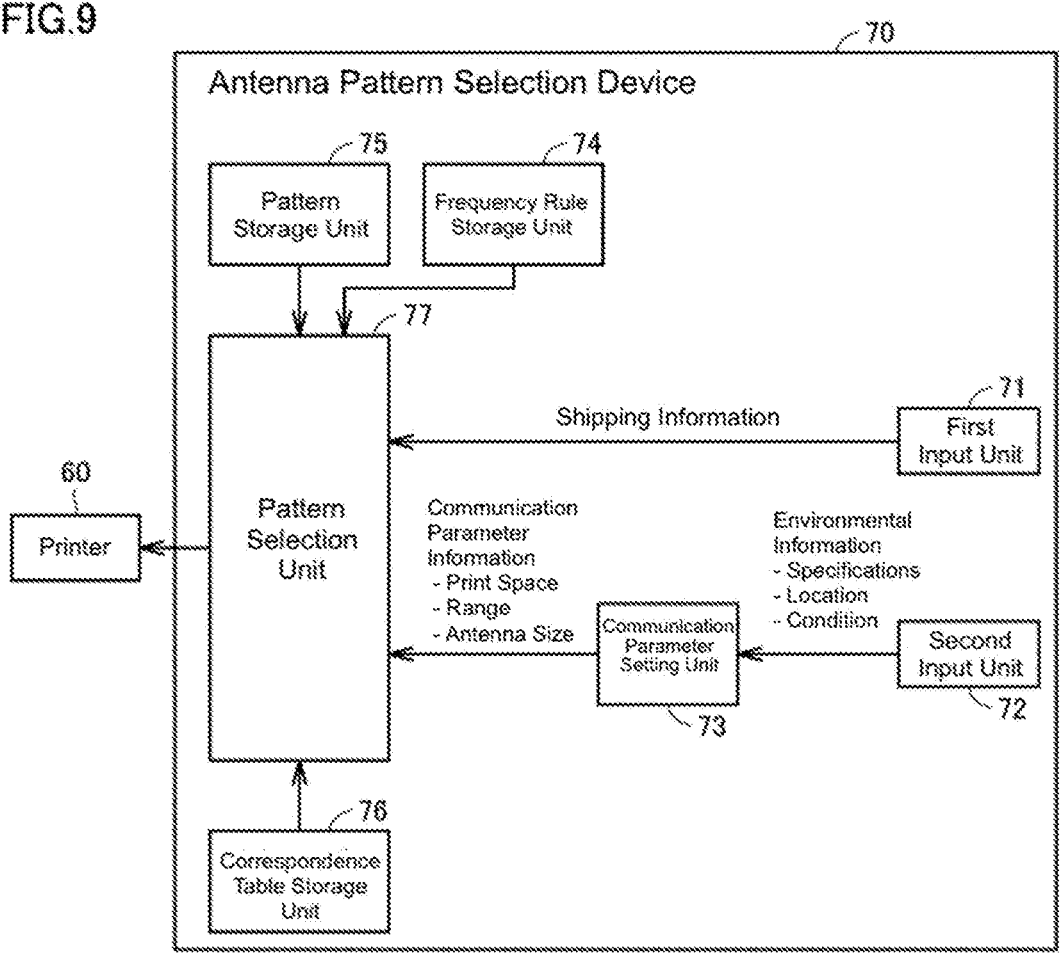
FIG. 9 is a block diagram illustrating a configuration of an antenna pattern selection device.

The antenna pattern selection device 70 is described with reference to FIG. 9; this device selects the pattern of the antenna wiring formed on the molded resin element 11. FIG. 9 is a block diagram illustrating a configuration of an antenna pattern selection device 70.

The antenna pattern selection device 70 generates a printing program that contains one antenna pattern selected from a plurality of antenna patterns and outputs the printing program it generates to a printer 60. As illustrated in FIG. 9, the antenna pattern selection device 70 includes a first input unit 71, a second input device 72, a communications parameter setting units 73, a frequency rule storage unit 74, a pattern storage unit 75, a correspondence table storage unit 76, and A pattern selection unit 77.

The first input unit 71 and the second input unit 72 accept information entered by a user. The first input unit 71 and the second input unit 72 may be configured from a keyboard, mouse, touchscreen panel, or the like.

The first input unit 71 accepts input of shipping information which indicates the shipping destination country or destination region of the relay 1. The second input unit 72 accepts input of environmental information which indicates the part specifications, usage location and usage condition of the relay 1. Here, the part specification is the specifications of the relay 1 and is identified by a specification number. For example, a given specification number may represent specifications where the antenna wiring 13 is formed on the surface 11a, i.e., the front side, of the molded resin element 11; while a different specification number may represent a specification where the antenna wiring 13 is formed on the upper surface 11b. The usage location is where the relay 1 may be used (outdoors, in a factory, or the like). The usage condition is a state in which the relay 1 may be used (e.g., ambient electromagnetic waves, or the like).

The communication parameter setting unit 73 establishes the communication parameter required for determining the shape of the antenna wiring 13 on the basis of the environmental information entered via the second input unit 72. The communication parameter setting unit 73 establishes communication parameters such as: a print space representing a location for printing the antenna wiring 13; the communication range required for the antenna wiring 13; the size of the antenna wiring 13 (the antenna size); and the like.

The communication parameter setting unit 73 establishes the print space in accordance with the part specification represented by the environmental information received from the second input unit 72. For example, the communication parameter setting unit 73 may establish the surface 11a as the print space when the communication parameter setting unit 73 receives a specification number designating that the antenna wiring 13 is formed on the surface 11a, which is the front side of the molded resin element 11.

The communication parameter setting unit 73 establishes a communication range in accordance with the usage location represented by the environmental information received from the second input unit 72. For example, the communication parameter setting unit 73 may establish a longer communication range when the usage location is outdoors, compared to when the usage location is in a factory. The communication parameter setting unit 73 may store information that associates a usage location and a communication range, in advance, and establish the communication range in accordance with said information. In this case, the second input unit 72 is preferably configured to accept only the usage location contained in said information.

The communication parameter setting unit 73 establishes an antenna size in accordance with the usage condition represented by the environmental information received from the second input unit 72. For example, the communication parameter setting unit 73 establishes an antenna size in relation to the weakness of the electromagnetic waves around the relay 1. The communication parameter setting unit 73 may store information that associates a usage condition (strength of electromagnetic wave) and an antenna size, in advance, and establish the antenna size in accordance with said information.

Besides the above described, the usage condition may also describe the compactness of the relay 1. The compactness of the relay 1 may represent the distance to another relay 1, or the number of relays 1 installed in a given unit area. A plurality of individual relays 1 may be used close together; this may create interference in the wireless communication from the IC chip 12 because the antenna wiring 13 printed on the molded resin elements 11 or the relays 1 are adjacent to each other. In addition to the setting the antenna size, the communication parameter setting unit 73 may also establish a print space or the shape of the antenna wiring 13 as a communication parameter in accordance with the compactness of the relay; here the print space specified is on the molded resin element 11 (i.e., the surface of the molded resin element 11 and a location on that surface).

The frequency rule storage unit 74 stores frequency rules established for each country or region. The pattern storage unit 75 stores a plurality of antenna patterns designed in advance. An antenna pattern may be a shape pattern for the antenna wiring 13. Each antenna pattern may be associated with a pattern number that identifies said pattern. The plurality of antenna patterns stored in the pattern storage unit 75 may include different types of antennas (such as, a patch antenna, loop antenna, dipole antenna, or the like).

The correspondence-table storage unit 76 stores a correspondence table which associates a frequency rule and communication parameter (print space, communication range, antenna size, and the like) with a pattern number. The correspondence table is established in advance. For instance, a pattern number corresponding to a given combination may be set as the pattern number of an antenna pattern where communication is possible with a reader at exactly the communication range in said given combination; or, to the pattern number of an antenna pattern where printing is possible in the print space in said given combination; or, the pattern number of an antenna pattern that satisfies the antenna size in said given combination and that resonates at a frequency included in a frequency rule in said given combination.

The pattern selection unit 77 selects one antenna pattern from a plurality of antenna patterns on the basis of the shipping information received from the first input unit 71 and the communication parameter received from the communication parameter setting unit 73. The pattern selection unit 77 reads the selected antenna pattern from the pattern storage unit 75, and generates a print program containing said antenna pattern. The pattern selection unit 77 outputs the print program generated to the printer 60.

The pattern selection unit 77 reads frequency rule corresponding to the shipping destination country or destination region indicated by the shipping information from the frequency rule storage unit 74. The pattern selection unit 77 identifies the pattern number corresponding to the frequency rule acquired, and the communication parameter information received from the communication parameter setting unit 73 (e.g., print space, communication range, antenna size, and the like) from the correspondence-table storage unit 76. The pattern selection unit 77 reads the antenna pattern of the pattern number identified from the pattern storage unit 75 as the antenna pattern for inclusion in the print program.

The pattern selection unit 77 outputs a print program that specifies where on the antenna pattern is the base point for connection to the terminal of the IC chip 12. The printer 60 identifies the location on the IC chip 12 from an image taken of the conveyed half-finished product (FIG. 4C); in addition to aligning the position of said IC chip 12 with the base point, the printer 60 prints an antenna wiring 13 with the specified antenna pattern.

The hardware for the antenna pattern selection device 70 may be constituted by a user interface, a central processing unit (CPU) that runs programs contained in an operating system (OS), read only memory (ROM) that stores various data, RAM that provides a work area for storing data needed for running programs with the CPU, and a hard drive (HDD) for fixed storage of programs or the like run by the CPU. The user interface may be used to configure the first input unit 71 and the second input unit 72. The communication parameter setting unit 73 and the pattern selection unit 77 may be implemented as programs stored on the HDD that the CPU runs. The frequency rule storage unit 74, the pattern storage unit 75, and the correspondence-table storage unit 76 may be configured from ROM and RAM.

Advantages

As above described method of manufacturing a relay 1 includes a molded resin element step (a first step) configured to produce a molded resin element 11 where an IC chip 12 is embedded by injecting a resin around an IC chip 12; an assembly step (a second step) configured to apply the molded resin element 11 to a base material 20 as an exterior jacket component 10 of the relay 1, the base material 20 serving as the main body of the relay; and an antenna wiring forming step (a third step) configured to print antenna wiring 13 on a surface 11a of the molded resin element 11, the antenna wiring 13 configured for the IC chip 12 to perform wireless communication.

The above configuration allows the antenna wiring 13 to be printed after the molded resin element 11 is applied to the base material 20 to serve as a portion of the exterior jacket component 10. Therefore, the product can be kept in inventory as a half-finished product 15 where no antenna wiring 13 is formed; the antenna wiring 13 may be formed immediately before shipping with the IC tag configured from the antenna wiring 13 and the IC chip 12. For instance, the antenna wiring 13 may be produced with a shape in accordance with the frequency rule, or the like of the shipping destination after the shipping destination is determined. Thus, a relay 1 can be easily manufactured within a short period after an order, where the relay 1 is provided with an IC tag that has a single antenna pattern that can be selected from various antenna patterns with mutually different antenna resonant frequencies or antenna forms.

The manufacturing method according to the first embodiment may further include an antenna pattern determination step (a fourth step); in this step, the pattern for the antenna wiring 13 is determined on the basis of at least one of the frequency rule of the shipping destination for the relay 1 and the usage environment for the relay 1. The antenna wiring 13 is printed during the antenna wiring forming step in the pattern determined in the antenna pattern determination step. A relay 1 may be easily manufactured where the relay 1 is provided with an antenna wiring 13 according to at least one of the frequency rule of the shipping destination and the usage environment of the relay 1.

The exterior jacket component 10 for relay 1 (the product) includes a molded resin element 11. The surface of the molded resin element 11 contains a surface 11a (first surface) that is the outer surface of the exterior jacket component 10. Moreover, the exterior jacket component 10 is provided with an IC chip 12 embedded in the molded resin element 11 and configured to store identification data that identifies the relay 1, and an antenna wiring 13 formed on the surface 11a and configured to allow the IC chip 12 to perform wireless communication.

In the above described configuration, the antenna wiring 13 is formed on the surface 11a which is an outer surface of the exterior jacket component 10. Therefore, the product can be kept in inventory as a half-finished product 15 where no antenna wiring 13 is formed; the antenna wiring 13 may be formed immediately before shipping with the IC tag configured from the antenna wiring 13 and the IC chip 12. For instance, the antenna wiring 13 may be produced with a shape in accordance with the frequency rule, or the like of the shipping destination after the shipping destination is determined. Thus, the exterior jacket component 10 of the relay 1 is provided with an IC tag that has a single antenna pattern that can be selected from various antenna patterns with mutually different antenna resonant frequencies or antenna configurations. Hereby, a relay 1 can be easily manufactured within a short period after an order, where the relay 1 includes an IC tag with an antenna pattern than can be selected from various types of antenna patterns.

The IC tag may be pasted to the product with an adhesive agent; in this case, the IC tag can be easily peeled from the product as with existing IC tags. Therefore, this allowed for fraudulent activity where a valid IC tag was pasted to an invalid product, or an invalid IC tag was pasted to a valid product. However, the exterior jacket component 10 according to the first embodiment requires changing the exterior jacket component 10 in order to improperly change the IC chip 12 since the IC chip 12 is embedded in the molded resin element 11 which serves as the body of the exterior jacket component 10. It is thus possible to prevent the above mentioned fraudulent actions.

The exterior jacket component 10 preferably further includes an insulating film 14 formed on the antenna wiring 13. Thus, this presents prevents sulphuration or oxidation of the antenna wiring 13, and prevents wear of the antenna wiring 13 from mechanical loads.

The IC chip 12 is exposed from the surface 11a. The antenna wiring 13 is electrically connected to the IC chip 12. The antenna wiring 13 may thus be used as an antenna directly connected to the IC chip 12.

The antenna pattern selection device 70 according to the first embodiment includes a first input unit 71, a second input unit 72, a communication parameter setting unit 73, and a pattern selection unit 77. The first input unit 71 accepts input of shipping destination information which indicates the shipping destination of the relay 1. The second input unit 72 accepts input of environmental information which indicates the usage environment for the relay 1. The communication parameter setting unit 73 establishes a communication parameter for the antenna wiring 13 on the basis of the usage environment represented by the environmental information. The pattern selection unit 77 selects a pattern for the antenna wiring 13 corresponding to shipping destination indicated by the shipping destination information and the communication parameter established by the communication parameter setting unit 73 on the basis of a correspondence table that associates the shipping destination and the communication parameter with a pattern for the antenna wiring 13. A pattern may be easily selected for the antenna wiring 13 on the basis of the frequency rule of the shipping destination and the usage environment.

Second Embodiment

In the above described embodiment, the antenna wiring 13 is used as an antenna in direct connection with the IC chip 12. In contrast, in the second embodiment the antenna wiring 13 is used as a booster antenna for amplifying the faint electromagnetic waves transmitted from an IC module containing the IC chip 12. The antenna wiring 13 is not directly electrically connected to the IC chip 12.

Figure 10:
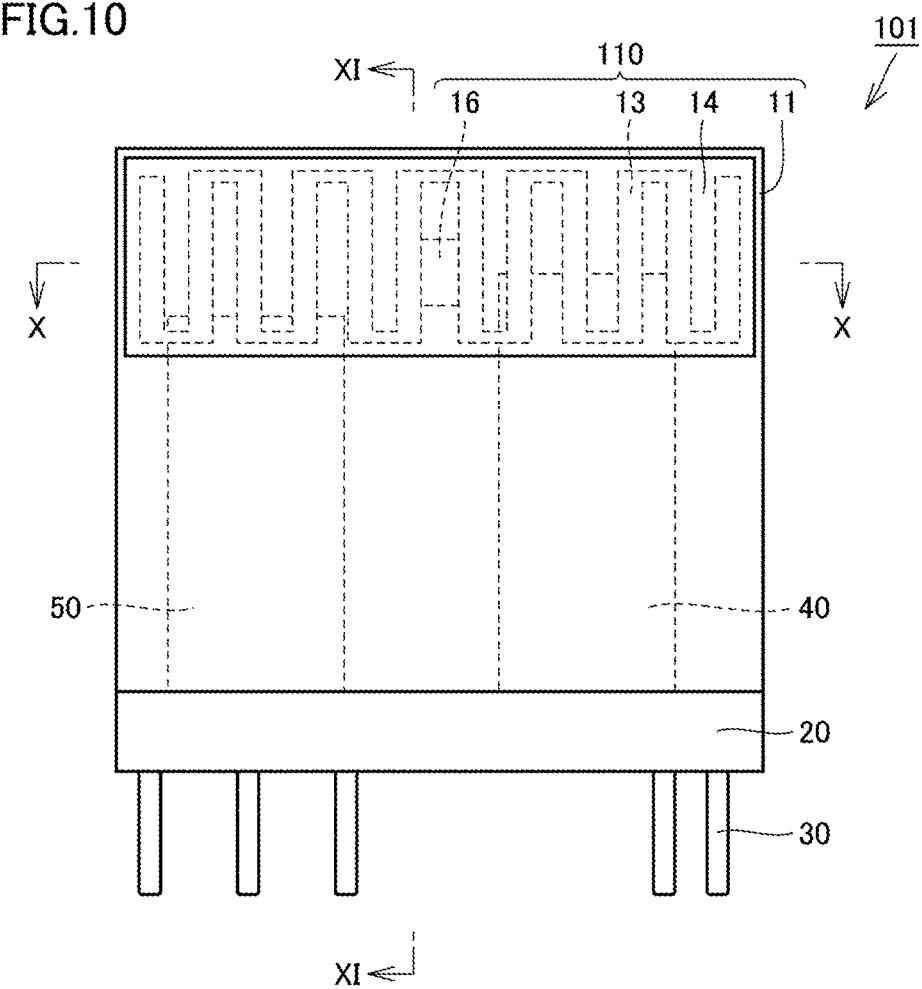
FIG. 10 is a front view illustrating a relay according to a second embodiment.
Figure 11:
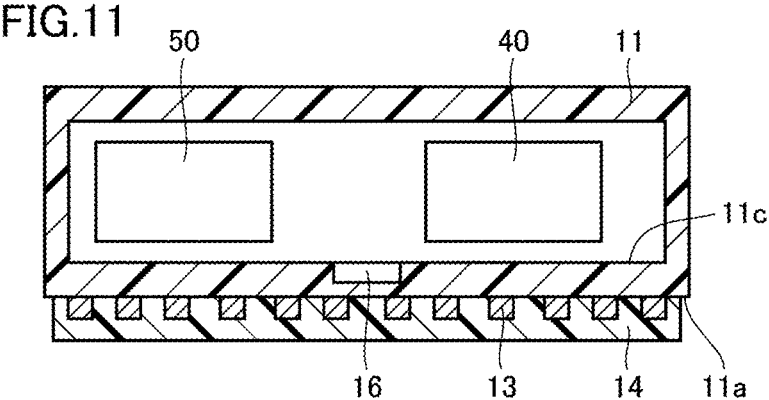
FIG. 11 is a cross-sectional view along the line X-X in FIG. 10.
Figure 12:
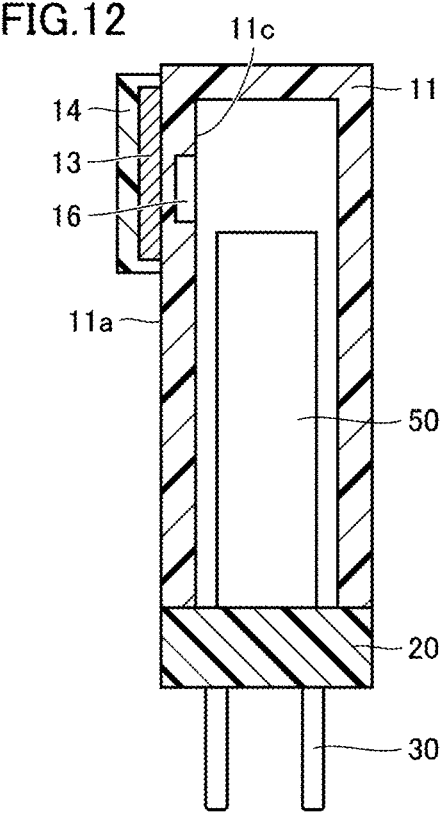
FIG. 12 is a cross-sectional view along the line XI-XI in FIG. 10.

An overview of the configuration of a relay 101 (a product) is described with reference to FIG. 10 through FIG. 13; the relay 101 is provided with an exterior jacket component 110 according to the second embodiment. FIG. 10 is a front view illustrating a relay 101 according to a second embodiment; FIG. 11 is a cross-sectional view along the line X-X in FIG. 10; FIG. 12 is a cross-sectional view along the line XI-XI in FIG. 10; And FIG. 13 illustrates a schematic configuration of an IC module 16.

As illustrated in FIG. 10 through FIG. 12, the relay 101 differs from the relay 1 of the first embodiment in that the relay 101 includes the exterior jacket component 110 instead of the exterior jacket component 10. The exterior jacket component 110 differs from the exterior jacking component 10 in that the exterior jacket component 110 includes an IC module 16 instead of the IC chip 12. All other features are identical to the relay 1 of the first embodiment; therefore a description thereof is not repeated below.

Figure 13:
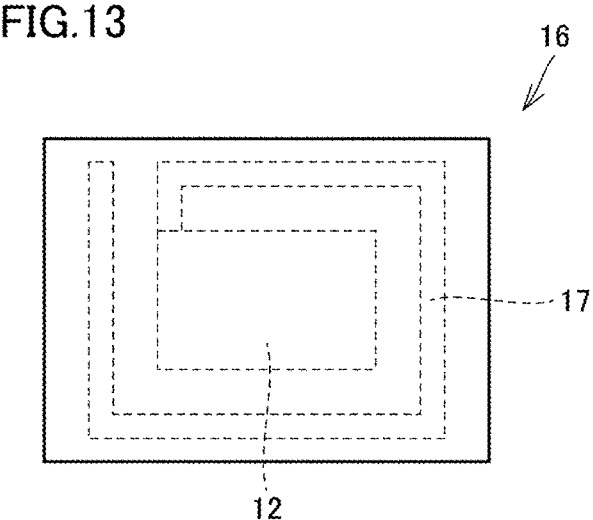
FIG. 13 illustrates a schematic configuration of an IC module.

As illustrated in FIG. 13 the IC module 16 contains an IC chip 12, and an IC-side antenna 17 electrically and directly connected to the IC chip 12. The IC chip 12 performs wireless communications via the IC-side antenna 17. The IC-side antenna 17 is a relatively small sized antenna and can only transmit faint electromagnetic waves. Therefore, in the second embodiment the antenna wiring 13 can function as a booster antenna for amplifying the faint electromagnetic waves transmitted from the IC-side antenna 17.

Returning to FIG. 10 through FIG. 12, the IC module 16 is embedded in the molded resin element 11 to be exposed from a surface 11c at the underside of the surface 11a of the molded resin element 11. The antenna wiring 13 is produced at a location on the surface 11a facing the IC module 16; the antenna wiring 13 is electromagnetically coupled to the IC-side antenna 17 in the IC module 16. That is, the antenna wiring 13 performs impedance matching with the IC-side antenna 17 in the IC module 16. The IC chip 12 performs wireless communications via the IC-side antenna 17 and the antenna wiring 13.

Hereby, an exterior jacket component 110 according to the second embodiment embeds the IC module 16 in the molded resin element 11 so that the IC module 16 is exposed from a surface 11 C (second the surface) at the underside of the surface 11a (first surface) of the molded resin element 11. The antenna wiring 13 is formed on the surface 11a to face the IC module 16. It is thus possible to prevent the IC module 16 from breaking due to an environmental load on the relay 101, such as external mechanical stress, humidity, or the like.

The antenna wiring 13 is formed either location that allows the antenna wiring 13 to be electromagnetically coupled to the IC-side antenna 17 in the IC module 16. Therefore, the printer 60 must identify the location of the IC module 16 and print the antenna wiring 13 on the basis of said location. The molded resin element 11 is preferably made from a transparent material in order to facilitate identifying the location of the IC module 16 which is embedded on the inner surface thereof.

Third Embodiment

In the above described second embodiment, the antenna wiring 13 is positioned facing the IC module 16. In contrast, in the second embodiment the IC module 16 is placed so that the IC module 16 is exposed at the outer surface of the exterior jacket component. The antenna wiring 13 is created so that the antenna wiring 13 does not overlap the IC module 16.

Figure 14:
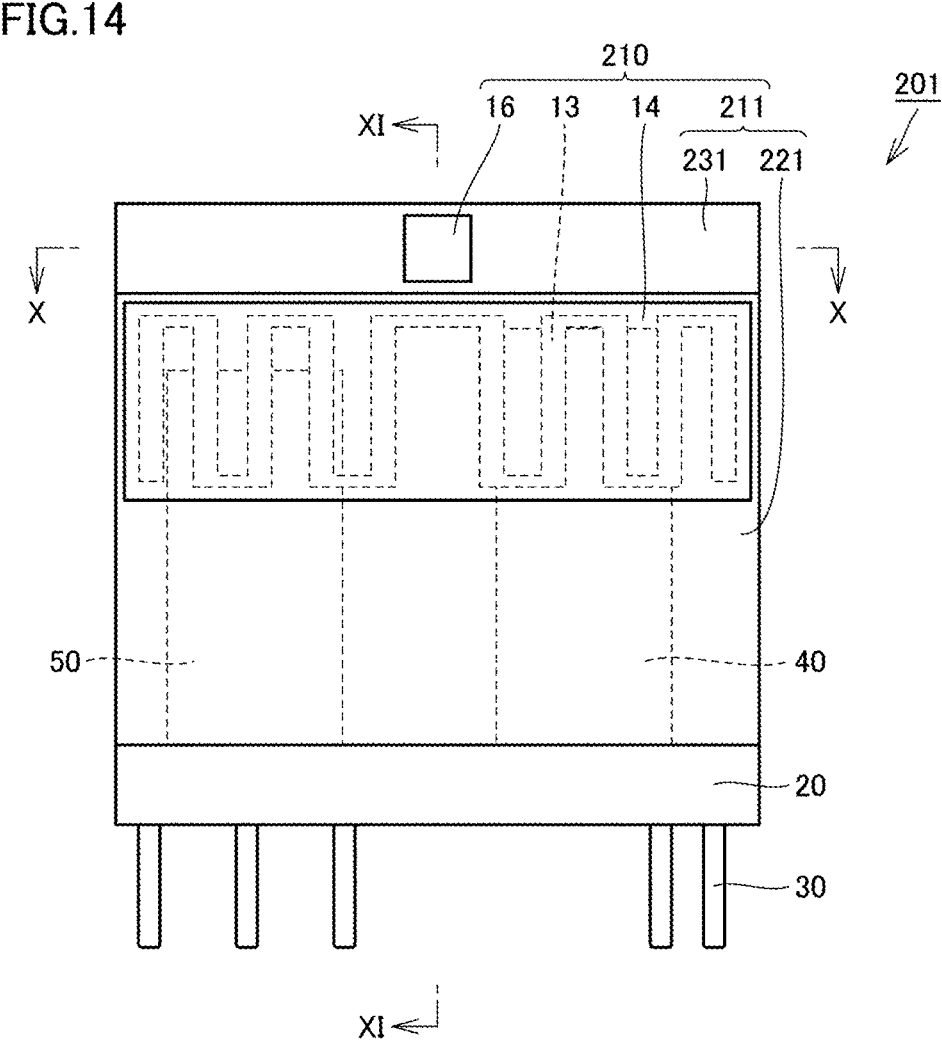
FIG. 14 is a front view illustrating a relay according to a third embodiment.
Figure 15:
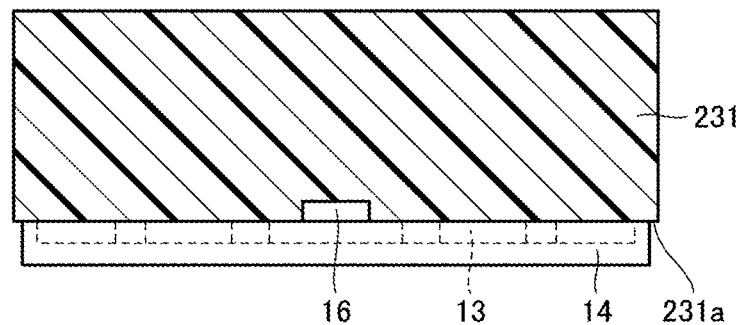
FIG. 15 is a cross-sectional view along the line X-X in FIG. 14.

An overview of the configuration of a relay 201 (a product) is described with reference to FIG. 14 through FIG. 16; the relay 201 is provided with an exterior jacket component 210 according to the third embodiment. FIG. 14 is a front view illustrating the relay 201 according to the third embodiment; FIG. 15 is a cross-sectional view along the line X-X in FIG. 14; and FIG. 16 is a cross-sectional view along the line XI-XI in FIG. 14.

Figure 16:
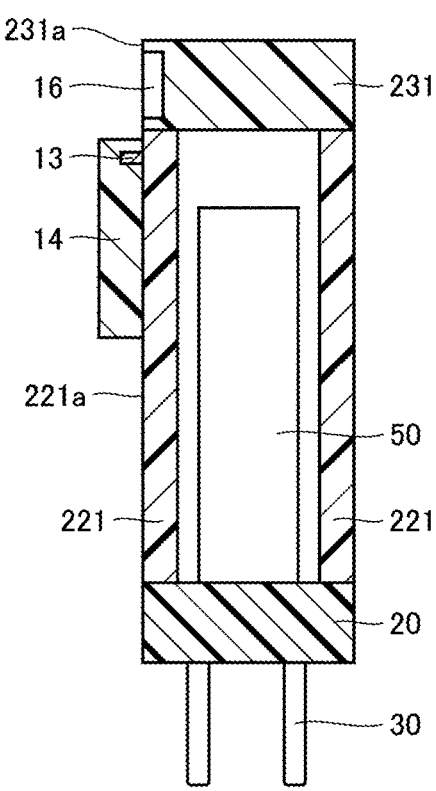
FIG. 16 is a cross-sectional view along the line XI-XI in FIG. 14.

As illustrated in FIGS. 14-16, the relay 201 differs from the relay 101 of the second embodiment in that the relay 201 includes the exterior jacket component 210 instead of the exterior jacket component 110. The exterior jacket component 210 differs from the exterior jacking component 110 in that the exterior jacket component 210 includes a molded resin element 211 instead of the molded resin element 11. All other features are identical to the relay 101 of the second embodiment; therefore a description thereof is not repeated below.

The molded resin element 211 contains a first molded resin component 221 and a second molded resin component 231. The first molded resin component 221 and the second molded resin component 231 are integrated through adhesive agents or mechanically structured bonding to create the molded resin element 211. The exterior jacket component 210 can thus be a large size. Moreover, this facilitates obtaining an exterior jacket component 210 with a complicated structure.

The first molded resin component 221 is a cylinder. The open end of the first molded resin component 221 is bonded to the surface of the base material 20 which the electromagnet 40 and the contact part 50 are mounted.

The second molded resin component 231 is a flat panel bonded to the other open end of the first molded resin component 221 to close off the other open end of the first molded resin component 221.

The surface 221a on the front side of the first molded resin component 221 and the surface 231a on the front side of the second molded resin component 231 are in the same plane.

The IC module 16 is embedded in the second molded resin component 231 so that the IC module 16 is exposed from the surface 231a. The antenna wiring 13 is formed at a location on the surface 221a of the first molded resin component 221 where the antenna wiring 13 is electromagnetically couples to the IC-side antenna 17 in the IC module 16.

The molded resin element 211 thus contains a first molded resin component 221 and a second molded resin component 231. The antenna wiring 13 is formed on the surface 221a (first surface) which is a portion of the outer surface of the first molded resin component 221. The outer surface of the second molded resin component includes a surface 231a (second surface) that lies in the same plane as the surface 221a. The IC module 16 is embedded in the second molded resin component 231 so that the IC module 16 is exposed from the surface 231a. Thus, the antenna wiring 13 is not formed at an interface between the first molded resin component 221 and the second molded resin component 231. Consequently, this prevents the antenna wiring 13 from breaking.

All aspects of the embodiments disclosed should be considered merely examples and not limitations as such. The scope of the present invention is not limited to the above description but to the scope of the claims which is intended to include all equivalents and modifications allowable thereby.

REFERENCE NUMERALS 1,101,201 Relay
10,110,210 Exterior jacket component
11,211 Molded resin element
11a,11c,221a,231a Surface
11b Upper surface
12 IC chip
13 Antenna wiring
14 Insulating film
15 Half-finished product
16 IC module
17 IC-side antenna
20 Base material
30 Terminal
40 Electromagnet
50 Contact part
60 Printer
70 Antenna pattern selection device 71 First input unit
72 Second input unit
73 Communication parameter setting unit
74 Frequency rule storage unit
75 Pattern storage unit
76 Correspondence-table storage unit
77 Pattern selection unit
100 Temporary fixing sheet
221 First molded resin component
231 Second molded resin component

The invention claimed is:

1. A manufacturing method for a product, the manufacturing method comprising:
- injecting resin to surround an IC chip storing identification data that identifies said product to thereby create a molded resin element with the IC chip embedded therein;
- applying the molded resin element to a product unit as an exterior jacket component for the product;
- determining a pattern for antenna wiring on the basis of shipping information indicating a shipping destination for the product and environment information indicating a usage environment for the product; and
- printing the determined pattern for the antenna wiring onto an outer surface of the molded resin element applied to the product unit, the antenna wiring configured for the IC chip to perform wireless communication, wherein
- determining the pattern for the antenna wiring includes:
  - selecting a communication parameter for the antenna wiring on the basis of the usage environment indicated by the environment information; and
  - selecting the pattern for the antenna wiring corresponding to the shipping destination indicated by the shipping information and the selected communication parameter on the basis of information mapping the shipping destination and the communication parameter to the pattern for the antenna wiring.

* * * * *